US009156031B2

(12) United States Patent
Gruner et al.

(10) Patent No.: US 9,156,031 B2
(45) Date of Patent: Oct. 13, 2015

(54) PIPETTE

(75) Inventors: Kathlen Gruner, Hamburg (DE); Boris Von Beichmann, Hamburg (DE); Werner Lurz, Kaltenkirchen (DE); Günther A. Mohr, Bad Doberan (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 13/877,643

(22) PCT Filed: Sep. 30, 2011

(86) PCT No.: PCT/EP2011/004896
§ 371 (c)(1), (2), (4) Date: Sep. 17, 2013

(87) PCT Pub. No.: WO2012/045418
PCT Pub. Date: Apr. 12, 2012

(65) Prior Publication Data

US 2014/0007712 A1 Jan. 9, 2014

Related U.S. Application Data

(60) Provisional application No. 61/483,588, filed on May 6, 2011.

(30) Foreign Application Priority Data

Oct. 4, 2010 (DE) ......................... 10 2010 047 126

(51) Int. Cl.
*G01L 3/02* (2006.01)
*B01L 3/02* (2006.01)

(52) U.S. Cl.
CPC ............... *B01L 3/021* (2013.01); *B01L 3/0227* (2013.01); *B01L 3/0234* (2013.01); *B01L 3/0237* (2013.01); *B01L 3/0224* (2013.01); *B01L 3/0279* (2013.01); *B01L 2200/087* (2013.01); *B01L 2200/14* (2013.01); *B01L 2200/143* (2013.01); *B01L 2300/023* (2013.01); *B01L 2300/024* (2013.01);
(Continued)

(58) Field of Classification Search
None
See application file for complete search history.

(56) References Cited

U.S. PATENT DOCUMENTS 4,967,606 A * 11/1990 Wells et al. ................ 73/864.18
6,254,832 B1 * 7/2001 Rainin et al. .................. 422/525
2002/0018734 A1 2/2002 Braun et al.
(Continued)

FOREIGN PATENT DOCUMENTS

EP 1256327 A1 11/2002
WO 2005/079989 A1 9/2005
(Continued)

*Primary Examiner* — Robert R Raevis
(74) *Attorney, Agent, or Firm* — Vidas, Arrett & Steinkraus, P.A.

(57) ABSTRACT

The present invention relates to a pipette having:

a rod-shaped handle body in which a drive unit is arranged for a displacement unit having an operating element in the top end, and having a seat for a pipette tip or syringe in the bottom end, wherein the handle body has a front grip surface that is approximately straight in the bottom part of the handle body in a vertical sectional plane through the handle body, and curves across the handle body toward a thumb rest in the top part of the handle body above the area that comes into contact with the surface of the hand, and the operating element actuatable with the thumb is arranged in the thumb rest.

36 Claims, 11 Drawing Sheets

(52) U.S. Cl.
CPC .... *B01L 2300/025* (2013.01); *B01L 2300/0832* (2013.01)

(56) References Cited

U.S. PATENT DOCUMENTS

| | | | | |
|---|---|---|---|---|
| 2004/0215631 | A1 | 10/2004 | Mellenthin et al. | |
| 2005/0118069 | A1 | 6/2005 | Solotareff et al. | |
| 2006/0096349 | A1 * | 5/2006 | Czernecki et al. | 73/1.74 |
| 2009/0071266 | A1 | 3/2009 | Nelson et al. | |
| 2009/0071267 | A1 * | 3/2009 | Mathus et al. | 73/864.14 |
| 2012/0201722 | A1 * | 8/2012 | Telimaa et al. | 422/501 |
| 2012/0291567 | A1 * | 11/2012 | Homberg et al. | 73/864.13 |
| 2013/0095508 | A1 * | 4/2013 | Campitelli et al. | 435/7.94 |

FOREIGN PATENT DOCUMENTS

| | | | |
|---|---|---|---|
| WO | 2005/085775 | A1 | 9/2005 |
| WO | 2007/121324 | A1 | 10/2007 |

* cited by examiner

PIPETTE

CROSS-REFERENCE TO RELATED APPLICATIONS

This is a national stage application of PCT/EP2011/004896, Filed on Sep. 30, 2011 which claims priority to DE 10 2010 047 126.7, filed on Oct. 4, 2010, and also claims priority to 61/483,588, filed on May 6, 2011, the entire content of which are hereby incorporated by reference.

STATEMENT REGARDING FEDERALLY SPONSORED RESEARCH

Not applicable.

BACKGROUND OF THE INVENTION

The invention relates to a pipette.

Pipettes are handheld or stationary dosing devices that in particular are used in the laboratory for dosing liquids. "Liquids" mean liquid media in the form of samples that are single-phase liquids or liquid mixtures, or multiphase liquid mixtures (such as emulsions) or liquid-solid mixtures (such as suspensions) or liquid-gas mixtures (such as foams).

Air displacement pipettes have a seat for releasably holding a pipette tip. A displacement unit for air is integrated in the pipette and, communicating by means of a channel, is connected to a hole in the seat. An air cushion is displaced by means of the displacement unit so that liquid is aspirated into, or discharged from, a tip opening depending on the direction of displacement of the air cushion. The displacement unit is usually a cylinder having a plunger displaceable therein. The plunger is driven by means of a drive unit. The designation "air displacement pipette" is based on the air cushion between the liquid and the displacement unit.

Positive displacement pipettes work together with syringes that have a syringe cylinder and a syringe plunger that is displaceable therein. The syringes can be coupled to or released from the positive displacement pipettes. The syringe cylinder is held in the positive displacement pipette and the syringe plunger is held in a plunger seat that can be displaced by means of a drive unit. By means of the drive unit, the syringe plunger is moved back and forth so that the liquid is aspirated into, or discharged from, a hole in the tip. The designation "positive displacement pipette" is based on that there is no air cushion between the liquid and syringe piston, and the syringe piston directly displaces the liquid.

When designed as a dispenser, the positive displacement pipette has a drive unit that enables a stepwise discharge in partial amounts of a complete quantity of liquid aspirated by the syringe.

Pipettes are known with a manually driven mechanical drive unit, or an electromechanically driven drive unit, or a manually driven mechanical drive unit with electromechanical support (servodrive). In addition, there are pipettes with a fixed and adjustable volume. In addition, dispensers are known in which the partial amount to be dispensed is adjustable. Furthermore, there are single-channel pipettes for use with only a single pipette tip, and multichannel pipettes for simultaneous use with several pipette tips or syringes.

Pipette tips or syringes preferably consist of plastic and can be thrown away as a disposable item after use, or respectively can be replaced with a fresh pipette tip or syringe. Pipette tips or syringes are provided in various sizes for dosing within various volume ranges.

Pipettes have operating elements for controlling the aspiration and discharge of liquid, and possibly for releasing the pipette tip or syringe from the pipette. They also have operating elements that can be used for the manual entry of user parameters (such as the dosing volume, dosing speed, material constants of the liquid, calibration data), and/or modes of operation (such as pipetting, dispensing, titrating, mixing), and/or operating procedures for processing samples (such as aspirating, mixing and discharging liquids). Furthermore, they are provided with a display unit that serves to display operating data (such as user parameters, mode of operation, operating procedures, operating state) of the pipette.

The operating and display units are primarily arranged on the top end of the pipette. The pipette housing generally widens there to accommodate these elements. Pipettes are known with an approximately rod-shaped housing that has a housing head on the top which is angled like a lectern and may protrude at one side. Electrical switches or respectively keys and at least one display are accommodated in this housing head. Liquid crystal displays (LCDs) are conventional displays. Such pipettes are described in EP 1 825 915 A2, EP 1 859 869 A1 and EP 1 878 500 A1. As pipettes become increasingly complex, operating and display units are generally used with more complex entry devices and larger display units.

A disadvantage is that the pipettes protrude at the top due to the operating and display units that are contained therein, are heavy, and are nevertheless difficult to operate and read since they are small. This makes the pipettes difficult to handle, and there is a potential risk of misuse. In addition, a substantial part of the cost of the pipettes arises from the operating and display units. Complex tasks such as creating routines and programs with the integrated operating and display units are difficult to master. If pipettes are equipped with a smaller operating and display unit, this further reduces the ease of operation.

DE 199 11 397 A1 describes an autonomous pipette with a device control and a sensor unit for capturing operating data that has a wireless interface for transmitting data and/or for controlling the device. The pipette can be easier to control using this interface by means of remote control. The autonomous pipette can be used in a conventional manner without remote control. The autonomous pipette requires operating and display units to do this.

EP 0 999 432 B1 describes an electronic dosing system where routines for performing operating procedures can be entered into a manual dosing device by means of a data processing system via contacting or wireless data interfaces. In addition, operating parameters can be entered into the manual dosing device and the manual dosing device can be controlled by means of the data processing system. The operating parameters are user parameters (such as dosing volumes, dosing speeds), device-type specific parameters (such as parameters determining the plunger movement, parameters determining the quantity, parameters relating to the monitoring of operating states), or device-specific parameters (such as device identification, an ID code for a saved set of parameters). The manual dosing device has its own operating and display units.

A similar dosing system is described in WO 2005/052781 A2. The pipette is also provided with its own operating and display units.

U.S. Pat. No. 7,640,787 B2 describes a verification unit for a pipette. The pipette has means for measuring a volume displaced by the plunger of the pipette, for comparing the measurement with a desired value, and for displaying an error. The reference to an error is displayed by an LCD display on the pipette. In addition, the result of the comparison can be transmitted wirelessly via an interface to a computer for recording. The pipette has its own operating units and its own meter for displaying the liquid volume to be released.

U.S. Pat. No. 4,821,586 describes a pipette system in which a pipette is controlled by a programmed control unit to execute a dosing function selected from a set. This can be for example pipetting individual liquid volumes, dispensing several partial volumes of an aspirated liquid volume, and dilutions and titrations. The control unit also allows new programs for dispensing functions to be written and saved. The control unit contains the controls for the pipette, and is connected via a flexible electrical cable to the motor, switches and lamps of the pipette.

WO 89/10193 describes a pipetting apparatus comprising a stationary unit having a plunger pump, a stepping motor for driving the plunger pump, and a microprocessor for controlling the stepping motor. By means of an entry box that is connected via an electric cable to the microprocessor, data and programs can be entered into the microprocessor. The entry box comprises a display that requests control commands, reproduces the response, and displays the status of the device. A pipette handle has electronic operating elements to trigger various functions including aspiration, discharge and mixing functions. The electronic operating elements are connected to the microprocessor by means of a second electric cable, and the pipette handle is connected to the plunger pump by means of a pneumatic hose. A pipette tip is connectable to a connector of the pipette handle. The stationary unit with the plunger pump and microprocessor, the entry box and the handle are therefore device components that are separate from each other and are connected to each other by means of flexible leads.

DE 195 06 129 A1 describes a toothbrush that has a pressure sensor in its handle to determine the correct pressure when brushing. The determined pressure values are supplied by means of a transmitter and a transmission antenna on the handle to a reception antenna of a display unit separate from the toothbrush. This indicates whether brushing is occurring with sufficient pressure. In addition, the time of brushing can be detected and signaled for different tooth regions.

WO 2008/131874 A1 describes a method for the wireless, unidirectional transmission of data between a transmitter and a receiver, wherein the transmitter sequentially transmits a data record to be transmitted several times over a plurality of transmission channels, and the receiver receives data records on only one transmission channel. The number of transmission channels used is less than the number of repetitions with which the transmitter transmits the data record, and a sequence of transmission channels is used within which the sequence of transmission channels used is specified. Furthermore, it describes a toothbrush having a transmitter for executing the aforementioned procedure and a system consisting of a toothbrush and a separate auxiliary device, wherein a transmitter is in the toothbrush and a receiver is in the auxiliary device. The auxiliary device is provided with a display unit for displaying the transmitted data. For example, the pressure is determined in the toothbrush with which a user presses the brush attachment against the teeth while brushing, and/or the brushing time, and/or the charge of an accumulator contained in the hand part for supplying the electrical toothbrush with power.

WO 98/257 36 A1 describes an electrical shaving system having an electric shaver and a remote control having a display unit for displaying specific data. The display unit displays status messages about the razor, and provides the user with feedback while shaving. The remote control can also be provided with buttons, keys or slider controls for setting the shaving parameters of the razor. Sensors for ambient conditions can also be contained in the remote control to supply the electric razor with information that is relevant for shaving comfort. The exchange of data between the remote control and razor can be wireless, and possibly bidirectional.

BRIEF SUMMARY OF THE INVENTION

Against this background, it is an object of the invention to provide a pipette with improved and/or expanded functioning and handling.

The pipette has:

- an elongated, preferably rod-shaped handle body in which a drive unit is arranged for a displacement unit having an operating element in the top end, and having a seat for a pipette tip or syringe in the bottom end, characterized in that
- the handle body has a front grip surface that is approximately straight in the bottom part of the handle body in a vertical sectional plane through the handle body, and curves across the handle body toward a thumb rest in the top part of the handle body above the area that comes into contact with the surface of the hand,
- the operating element actuatable with the thumb is arranged in the thumb rest.

In the pipette according to the invention, the design of the front grip surface assists the user during use and offers a soft and comfortable thumb rest. The pipette is therefore particularly easy to handle. Preferably, the front grip surface curves continuously from the straight section in the top part of the handle body.

In a pipette that is equipped with pipette tips, the handle body comprises a displacement unit having a displacement organ that is coupled to the drive for the displacement unit. The displacement unit is preferably a cylinder having a plunger displaceable therein as the displacement organ. With a pipette that can be equipped with syringes, the syringe is the displacement unit. The drive for the displacement unit has a coupling unit that can be coupled to the syringe plunger of the syringe to displace it in the syringe cylinder of the syringe. This also applies to the following solution.

A pipette according to the invention has:

- an elongated, preferably rod-shaped handle body in which a drive unit is arranged for a displacement unit having an operating element in the top end, and having a seat for a pipette tip or syringe in the bottom end, characterized in that
- the handle body has a rear grip surface having a recess below the top end in which another operating element is arranged that can be actuated with the index finger.

With the pipette according to the invention, the recess in the rear grip surface can accommodate the index finger of the user, and hence the hand can serve as a support when gripping and actuating the pipette. The operation of the other operating element is made easier by its arrangement in the recess which increases the freedom of movement for the index finger. This pipette is particularly easy to handle.

The pipettes have an elongated handle body. It is preferably rod-shaped. Accordingly, it substantially has the shape of a rod. Deviations in the shape of the handle body from the shape of a rod will be explained below.

According to one embodiment, the front grip surface is convex only in one direction, and the front grip surface in the bottom part of the handle body is nearly flat and narrow, and gradually widens in the top part of the handle body above the area that comes into contact with the surface of the hand, and curves across the handle toward the thumb rest that is enclosed by a radius at the top end of the handle.

According to another embodiment, the rear grip surface is nearly straight at the bottom in the vertical sectional plane through the front grip surface, and thereabove it initially curves inward in the recess area, and then curves outward in an opposite direction further above, above which it touches the top end of the thumb resting area, and curves on both sides of the vertical sectional plane toward the lateral grip surfaces that, on both sides, run toward the front grip surface with which they meet on both sides in a bevel.

With the pipette according to the invention, the front grip surface, in which an operating element is arranged at the top, is convex substantially only in one direction. It therefore extends toward the user. The site and rear grip surfaces are contrastingly spatially convex to optimally adapt to the hand of the user. The front grip surfaces meet each other on both sides in bevels that is a more or less round edge between the blending front and side grip surfaces. The pipette can be used with one hand. It is suitable both for lefthanders and right-handers. The pipette is preferably symmetrically designed with reference to the vertical axis that divides the front grip surface. The operating element in the thumb rest or the other operating element in the recess can also be easily reached by small hands without having to overextend one's fingers. The second hand can be used for other activities.

According to one embodiment, the operating element is a start/stop button with which the operating procedures, or parts of operating procedures, can be started and stopped as necessary. According to one embodiment, the pipette is adjusted (for example, the mode, dosing amount, plunger speed) and/or programmed (for example, several sequential operating procedures) by means of an external operating and display unit so that the procedures only need to be started or stopped as necessary by means of the operating element.

According to one embodiment, the handle narrows downward below the recess to achieve a pleasant downward narrowing of the volume.

According to another embodiment, the handle narrows more strongly in the vertical sectional plane that divides the front grip surface than in a vertical plane perpendicular thereto, and the degree of narrowing gradually decreases between these vertical planes.

According to another embodiment, the height of the handle is 100 to 180 mm and/or the circumference is 80 to 130 mm. A handle with dimensions within the indicated ranges is considered pleasant by users with different hand sizes. The height of the handle is preferably 120 to 140 mm and/or the circumference is preferably 90 to 120 mm. The preferred height is 133 mm, and the preferred circumference is 105 mm. The circumference is measured at the thickest point of the handle.

According to another embodiment, the operating element in the thumb rest area is a button. According to a preferred embodiment, the button is knob-shaped. Is also preferable for the button to be lens-shaped in a vertical section and project slightly upward beyond the front grip surface. The operating element is preferably an electrical operating element, by means of which an electromechanically driven drive unit is controllable by means of an electronic control unit. The operating element can also be a mechanical operating element of a manually driven mechanical drive unit.

According to another embodiment, another operating element is arranged in the rear grip surface in the area for resting the index finger. The other operating element is preferably the operating element of a tip ejector, i.e., a device for ejecting or releasing a pipette tip or syringe from the pipette.

According to another embodiment, the other operating element is a toggle switch. According to a preferred embodiment, the other operating element is saddle-shaped so that it adapts to the shape of the rear grip surface in the resting area for the index finger. The additional operating element preferably projects slightly beyond the rear grip surface.

According to another embodiment, the additional operating element is coupled to a mechanical drive unit that is coupled to a tip ejector that is assigned to the seat for a pipette tip or syringe in order release a pipette tip or syringe located there from the seat when the additional operating element is actuated. The drive unit is preferably mechanical because an electrical drive unit would require a high motor output or have a high energy consumption to disconnect pipettes tips or syringes from the seat.

According to another embodiment, there is a joint for pivoting the seat with reference to the handle between the seat of the pipette tip or syringe and the handle. By means of the joint, the alignment of the seat with reference to the handle can be adapted to the position of the user in the respective working position. In addition, the joint allows the hand position to be changed between work cycles and thereby reduces the concentrated load acting on the user of a pipette when the seat is arranged fixedly with reference to the handle.

According to another embodiment, a fixing unit for fixing the joint in a specific position is between the seat and the handle. The fixing unit is for example a threaded ring at the bottom end of the handle. By means of the fixing device, the alignment of the seat can be fixed with reference to the handle so that it does not unintentionally shift.

According to another embodiment, a seat for a pipette tip is arranged on a tubular carrier that projects downward from the bottom end of the handle. If the embodiment is provided with a joint, it is arranged between the tubular carrier and the handle.

According to another embodiment, the tubular carrier is conical and/or stepped, and narrows gradually and/or in steps. At the bottom end, a conical or cylindrical end section of the tubular carrier preferably forms the seat for attaching a pipette tip.

According to another embodiment, the tip ejector is a sleeve arranged on the tubular carrier, and the tubular carrier and sleeve can be displaced relative to each other by means of the mechanical drive unit. To eject a pipette tip, the sleeve is shifted further toward the bottom end of the tubular carrier at a seat at the bottom end of the tubular carrier to push off a pipette tip located there. Conversely, the tubular carrier can be withdrawn deeper into the sleeve.

According to another embodiment, a display unit such as an LCD display is arranged in the front grip surface. The display unit preferably has an elongated shape that extends in the longitudinal direction of the front grip surface. The display unit is preferably arranged in the bottom part of the handle. It serves to display operating data such as a mode, or the dosing volume and/or the charge of the battery or an accumulator and/or an error message and/or a warning.

According to one embodiment, the electronic pipette according to the invention comprises:

a. an electrically driven unit for pipetting liquids, and
b. an operating and/or display unit
c. where a device module comprises the unit for pipetting liquids,
d. an operating and/or display module physically separate from the device module completely or partially comprises the operating and/or display unit, and e. means are provided for wireless communication between the device module and the operating and/or display module.

Conventionally, the parts of electronic pipettes are combined into a physical unit. The operating and display elements are accommodated in a common housing with the unit for pipetting. The pipette according to the invention is divided into physically separate parts, that is, a device module and a physically separate operating and/or display module. The device module comprises the unit for pipetting. The unit for pipetting comprises a displacement unit and an electronic drive unit coupled thereto. The operating and/or display module completely or partly comprises the operating and/or display unit. In addition, the pipette according to the invention has means for wireless communication between the device module and the operating and/or display module. These are designed such that they transmit data from the device module to the operating and/or display module and/or in reverse direction. The device module and the operating and/or display module communicate via the wireless communication means in order to undertake the exchange of data necessary for operation and/or display. The communication between the modules can be unidirectional or bidirectional.

The device module has no, or only a reduced, operating and/or operating and/or display unit in comparison to conventional pipettes. In particular, the device module can be designed such that it has no operating and display unit, or no operating unit, or no display unit, or only parts of said units. The operating and/or display unit is completely or partially transferred to an operating and/or display module physically separate from the device module. The operating and/or display module can provide all of the operating and/or display functions of a conventional pipette. If the device module only has a reduced operating and/or display function, it is incapable of executing the basic function of the pipette without the operating and/or displayed module, and/or displaying the operating data necessary to execute the basic function. The device module without the operating and/or display module is preferably able to execute a preset operating state, but however not to set a new operating state with the assistance of a display unit. By actuating the operating unit, generated data and/or data for the display module can be transmitted in real time between the operating and/or display module and the device module.

According to the invention, the handling of the pipette is improved by completely or partially removing the operating and/or display unit from the device module and placing it in a separate operating and/or display module. The device module can be designed in a more space-saving and lighter manner than a conventional pipette. The operating and/or display module can also have a more user-friendly operating and/or display unit than a conventional laboratory device. In particular, the operating and/or display unit can have a more comprehensive input unit and/or a more advantageous screen size and/or resolution than a conventional pipette. Given a suitable size of the operating and/or display unit, simplified and/or expanded operating options and/or an improved and more extensive display of information are provided than with conventional pipettes. This relates in particular to data from the laboratory device that otherwise cannot be displayed due to lack of space. With the operating and/or and display module, in particular workflows of the pipette can be started and/or controlled (i.e., their execution can be influenced) and/or ended, and/or operating data (such as operating parameters, modes of operation, operating procedures, operating states) and/or performance data (such as measuring results, dosing amounts, yield) of the device module can be output. The operating and/or display module can be located separately from the device module to make it easier to operate the pipette and/or improve the perceptibility of the displayed information. The operating and/or display module is thereby in communication with the device module to perform the exchange of data necessary for operating and/or displaying information.

According to one variant of the invention, the entire operating unit and entire display unit are arranged in the operating and/or display module. According to another variant, only the entire operating unit is arranged in the operating and/or display module, and according to another variant, only the entire display unit is arranged therein. According to other variants, most of the operating unit and/or the display unit is arranged in the operating and/or display module. Accordingly, the majority of operating elements is arranged in the operating and/or display module, and the minority of operating elements is arranged in the device module, and/or the larger and/or higher-resolution display unit is arranged in the operating and/or display module, and the smaller display unit is arranged in the device module. In particular, the device module can merely be equipped with a few operating elements for basic functions (such as triggering a process and ejecting a single article) and/or an ancillary display for part of the data, and the operating and/or display module can be equipped with more operating elements (for example for entering dosing parameters, routines or programs) and with a display unit for all of the data to be displayed. The operation of the device module is made easier when it is only equipped with a single or a few operating elements.

According to one embodiment, the device module has only part of the functionally necessary operating and/or display units of the laboratory device, and the other functionally necessary operating and/or display units are arranged on the operating and/or display module. According to a further embodiment, only part of the functionally necessary operating and/or display units are arranged at the device module as well as at the operating and/or display module, so that part of the functionally necessary operating and/or display units are arranged at both modules. For example, the only functionally necessary operating and/or display units of a mechanical pipette with a variable dosing volume are a pushbutton, an adjusting element (such as a dial or a knob) for the dosing volume, and a volume display for the set dosing volume. In addition to the aforementioned operating and/or display units, a mechanical pipette with a variable dosing volume and pipette tip ejector has an ejector button for the ejector for ejecting the pipette tip. The device module preferably has the dosing knob, the adjusting element and—if there is an ejector—the ejector button, and the display module has the display unit. The functionally necessary operating and/or display units of an electronic pipette with a variable volume and pipette tip ejector consist of a dosing knob for triggering dosing steps, an adjusting element for adjusting the dosing volume, a display unit for displaying the set dosing volume, and an ejector button for the ejector. For example, the device module has the dosing knob and ejector knob, and the operating and display module has the adjusting element and display unit. In a further embodiment, the device module has the dosing knob and ejector knob and the operating and display unit has the adjusting element and display unit and additionally a dosing knob and/or ejector knob.

According to one embodiment, the laboratory device has operating units for starting, controlling and ending workflows, and at least one display unit. In addition, at least some of the operating and/or display units are arranged on the device module, and at least some of the operating and/or display units are arranged on the operating and/or display module. This decreases the equipping of the device module with operating and/or display units. According to one embodiment, the operating and/or display module—in addition to the other operating and/or display units—has additional operating and/or display units that the device module also has. This optionally allows certain operations to be performed with the operating and/or display module or the device module, or for displays to be read by the user from the operating and/or display module or the device module. According to another embodiment, the laboratory device has operating units for adjusting and/or programming workflows, and these operating units are assigned to the device module and operating and/or display module corresponding to the operating units for starting, controlling and ending workflows. According to one embodiment, the device module only has operating units for starting and/or controlling and/or ending workflows, and the operating and/or display module has the other operating units. According to another embodiment, the display units are exclusively arranged on the operating and/or display module.

The operating and/or display unit enables savings since it can be designed to be useable for a plurality of device modules of the same kind and/or for device modules that are different. This consequently enables a plurality of equivalent or respectively different device modules to manage with a single operating and/or display module. In addition, the manufacturer achieves a higher number of units with one specific operating and/or display module which enables more economic production. The display unit can in particular display operating data and/or performance data from the pipette. A plurality of device modules can be operated sequentially with the same operating and/or display module. It is also possible however to operate a plurality of device modules simultaneously using the same operating and/or display module. To this end, the means for wireless communication can comprise a plurality of channels, and to each device module is assigned a channel. Communication via a single channel is also possible, and the device modules can for example be assigned by means of device-specific data packets. Furthermore, one device module can work together with a plurality of operating and/or display modules, for example to operate the device module from several locations, and/or to display information about the work of the device module at several locations.

According to one embodiment, the device module comprises an electronic control unit for detecting operating data and/or controlling the electromechanical drive unit. The control unit can for example comprise at least one sensor for detecting operating data from the device module, and electronics for converting the signal of the sensor into a signal suitable for wireless communication. The electronic control unit can in particular have electronics for operating an electric drive motor.

According to one embodiment, the sensor is a sensor for detecting the set and/or actually dosed dosing volume. The sensor is, for example, a sensor for detecting the rotational position of a knob for the dosing volume, or a sensor for detecting the position of a stop for limiting the stroke of a displacement organ of a displacement unit, or a sensor for detecting the respective position or reached end position of a manually-controlled stroke of a displacement organ of the displacing unit (such as a plunger in a cylinder). Displacement sensors can be used for this. If the display unit displays the actually dosed dosing volume, it can display the currently achieved dosing volume and/or the dosing volume displayed when the end position is reached.

According to one embodiment, the sensor is a step counter for counting dosing steps, a force sensor for measuring the attachment force of a pipette tip, a set-down or contact sensor for detecting the setting-down of a pipette tip on a base, an acceleration sensor, a proximity sensor for detecting the use of the device module, or a tilt sensor for detecting the alignment of the device module.

According to another embodiment, the sensor is a sensor for detecting data of an RFID chip integrated in the device module.

According to another embodiment, data is exchanged between the device module and operating and/or display module according to the NFC (near field communication) transmission standard. NFC traces its roots back to radiofrequency identification (RFID). However, different from the RFID technology which only allows a reader to send radio waves to a passive electronic tag for identification and tracking, the NFC enables active communication between device module and the operating and/or display module or modules. NFC tags in the devices are either read-only or rewritable. There are two modes of NFC communication between the device module and operating and/or display module/s: passive communication mode whereby the initiator device provides a carrier field and the target device answers by modulating the existing field. In this mode, the target device may draw its operating power from the initiator-provided electromagnetic field, thus making the target device a transponder. In the active communication mode both initiator and target device communicate by alternately generating their own fields. A device deactivates its radiofrequency field while it is waiting for data. In this mode, both devices typically have power supplies. NFC is specially useful for authentication of the communication partners (device module and operating and/or display module/s) and increases the security that only approved devices communicate, i.e. share data, with each other.

A plurality of equivalent or different sensors of the aforementioned type can be accommodated together in one device module.

According to one embodiment, the operating and/or display module is designed such that operating parameters and/or operating data from the device module and/or programs can be entered by means of its operating elements to control the device module and/or routines for performing operating procedures of the device module.

According to one embodiment, the operating and/or display module is designed such that it can be used to remotely control device modules. For example, a device module can be started and stopped remotely by means of the operating and/or display module. Operating data and/or performance data can be displayed by the display unit in real time. Further, it is possible to control the transfer of measuring results from the device module to the operating and/or display module by remote control.

According to another embodiment, the operating and/or display module is designed such that it recognizes the respective device module when communicating with one device module of a plurality of device modules, and automatically sets a device-specific user interface on the operating and/or display unit. To this end, the means for wireless communication can transmit data from different device modules on different channels, or data from different device modules each with a device-specific ID. Alternately, the operating and/or display module can be designed such that the device-specific user interface can be set using a list offered by the operating and/or display module, and/or by entering a device number and/or device name.

If an operating and/or display module with one or more device modules is used by several users, a personalization function can be integrated in the operating and/or display module. According to one embodiment, the operating and/or display module is consequently designed such that one or more specific device modules can only be used when a proof of authorization is entered. This for example makes it possible to prevent device modules intended for specific purposes from being contaminated by deviating uses. According to one embodiment, the operating and/or display module is designed such that authorization is proved by entering a password and/or scanning a fingerprint and/or a retina scan, and/or an RFID acknowledge character generator, and/or data exchange via the NFC transmission protocol, or another suitable method. According to one embodiment, the operating and/or display module is designed such that certain programs, routines, measuring results and other data can only be created, displayed or processed when proof of authorization is entered.

Furthermore, an organization function can be integrated in the pipette. According to one embodiment, the operating and/or display module is designed with an integrated reservation function according to which the pipette can be blocked to certain users for certain periods. By means of an assigned identification, the device is reserved to specifically identifiable persons and/or groups of persons for whom the pipette is reserved during precisely specified periods. According to another embodiment, the operating and/or display module is designed to output information on whether the pipette is free for use, if use is finished, or the status reached by an ongoing application.

According to one embodiment, the operating and/or display module has switches and/or keys and/or a keyboard and/or a microphone and/or a screen (display) and/or a touch-sensitive screen (touchscreen) and/or a loudspeaker and/or an acoustic signal generator. Data can be entered with particular ease using the keyboard. The microphone enables operation by speech input. In addition to alphanumeric characters, images and/or symbols can be shown using the screen. The screen can in particular be an LCD, LED, TFT or CRT. By means of the loudspeaker and/or the acoustic signal generator, acoustic information can also be emitted (such as speech output and/or signal tones). The acoustic emission of noises, tones or other frequencies can be used to direct the operator.

The operating and/or display unit can be equipped with correspondingly designed electronic controls for identifying device modules and/or selecting a user-interface and/or remote control and/or interpreting by means of a personalization function and/or an organization function, and/or outputting information.

According to another embodiment, the device module can be handheld (that is, it can be held in the hand when being used by a user; preferably it is being held in only one hand and most preferably it is also operated only with one hand) and/or the operating and/or display module is portable (that is, it can be carried by the user and placed at a setup site of the user's choice) and/or handheld (that is, it can be held in the hand when being used by a user; preferably it is being held in only one hand and most preferably it is also operated only with one hand. The advantages of the invention are particularly manifest with a device module that can be hand-held. In comparison with conventional pipettes, it is easier to handle due to the more compact shape and the reduced and better distributed weight. A portable and/or /handheld operating and/or display module can be placed or held anywhere by the user so that it is in optimal reach for use and optimally arranged in the user's field of vision when the pipette device is being used. A handheld operating and/or display module is of such a light weight that it can be easily carried along by the user while he is pipetting with the device module. For example the handheld operating and/or display module fits easily in the pockets of conventional laboratory coats. Preferably the size of the the handheld operating and/or display module is such that it can be held and carried in one hand and operated at the same time.

The operating and/or display module can be a device created specifically for use in the pipette according to the invention. According to one embodiment, the operating and/or display module is a mobile phone and/or a personal digital assistant and/or a combination of a mobile phone and personal digital assistant (smartphone). Newly developed or commercially available products of the above kind can be used. In particular, smartphones with the IOS operating system (Apple Corporation) or Android® (Google Inc.), or also with operating systems of other manufacturers can be used. In particular, the iPhone® by Apple Corporation can be used which can be equipped with a special program to be developed (an app). Corresponding to the need of the laboratory device user, so-called tablet computers such as the IPad® (Apple Corporation), Playbook® (RIM Research in Motion) or Galaxy Tab® by Samsung can also be used, including the required apps.

The screen preferably has a high resolution of at least approximately 480×320 pixels with approximately 150 ppi, preferably at least 960×640 pixels. The minimum diagonal of the screen is preferably 3.5 inches or 8.89 cm. Screens can be used for displaying in black-and-white and/or in color.

Buttons, arrows and other keys can be used as operating elements analogous to the keyboards of PDAs, smartphones, etc. Alternatively, the screen can be a touchscreen analogous to an iPhone® or other devices and have a simulated keyboard, for example according to the standards of the Apple developer kits. This also includes multi-touch displays and screens with an oleophobic fingerprint-resistant coating. Alternately, other pressure or respectively touch-sensitive entry devices can be used as operating elements, including the necessary measures for recognizing text. Voice entry can also be an alternative. In the case of pressure or contact-sensitive entry media, the function of a gesture pad can be implemented according to Apple standards and beyond.

According to another embodiment, the operating and/or display module comprises a front view display (Head-Up-Display—HD) and/or a transparent display screen that can be placed in front of the work area. These embodiments allow the information to be optimally arranged within the user's field of vision. According to another embodiment, these are equipped with keys and/or a keypad and/or other operating elements.

According to one embodiment, the pipette comprises an electronic data processing system physically separate from the device module and operating and/or display module, and comprises means for communicating wirelessly or by wire between the operating and/or display module and the electronic data processing system. The electronic data processing system comprises for example a computer and/or network and/or server. By means of the data processing system, programs for one or more pipettes and/or routines for controlling operating procedures can be developed and/or updated for one or more laboratory devices, and/or data obtained from one or more laboratory devices can be evaluated and/or processed further and/or compressed and/or saved. The programs and/or routines can be programmed, and/or the data can be analyzed and/or processed further and/or compressed and/or saved, and/or the device modules and/or operating and/or display modules can be centrally updated by means of electronic data processing system in a particularly user-friendly manner.

According to another embodiment, the means for wireless communication communicate by means of radio waves and/or optically and/or inductively and/or capacitively. The communication can comprise all present and future technologies and protocols. Particularly suitable are RF protocols such as for keyboards or mice, Bluetooth, WLAN (wireless local area network), WCUSB (wireless certified USB), Zigbee and 4G. Typical formats for this are Bluetooth 2.1 plus EDR wireless technology, UMTS/HSDPA/HSUPA/GSM/EDGE or Wi-fi 802.11b/g/n. For optical transmission, transmission by means of infrared radiation is possible, especially according to the Infrared Data Association (IrDA).

The transmission of data by radio is described in WO 2008/131874 A1, DE 195 06 129 A1, DE 199 24 017 A, US 2004/152479 A, and WO 95/34960 A. The techniques described therein can be used within the context of the present invention. The related descriptions of the aforementioned documents are included in the application by means of reference.

According to one embodiment, the operating and/or display module is releasably connectable to the device module. The pipette can be used when the operating and/or display module is separate from the device module. In addition, the modules can be used in a connected state like a conventional pipette. They can form a handheld and/or stationery laboratory device in a connected state.

According to another embodiment, the pipette has an electrical charger for charging an electrical energy storage unit of the device module and/or the operating and/or display module. The electrical energy storage unit is preferably an accumulator or respectively a battery such as a lithium-ion battery. According to another embodiment, the charger is connectable via electric contacts to the device module and/or the operating and/or display module. According to another embodiment, the device module has an electrical charger for charging an electrical energy storage unit of the operating and/or display module. This allows an electric energy storage unit of the operating and/or display module to be charged using the electric charger of the device module. According to an alternate embodiment, the operating and/or display module has an electric charger for charging an electric energy storage unit of a device module. This allows the electric energy storage unit of the device module to be charged with the assistance of the operating and/or display module. The operating and/or display module is preferably provided with an electric charger since it is often unnecessary for the operating and/or display module to be easy to handle and can frequently be stationary during use.

According to another embodiment, the device module and the operating and/or display module have contacts that are connectable with each other for communication and/or transmitting an electrical charge between the device module and operating and/or display module.

According to one embodiment, the device module has a maximum of three operating elements. According to one embodiment, the device module has an operating element for starting, and possibly for controlling, and possibly for ending dosing procedures. According to another embodiment, the device module has another operating element for ejecting a pipette tip or syringe from the device module. According to another embodiment, the device module has another operating element for setting the dosing volume to be dosed.

According to one embodiment, a device module has a pushbutton as the operating element for moving a displacement organ of the displacement unit. In this embodiment, the device module preferably has a spring that moves the displacement organ and the pushbutton back into a home position after a discharge stroke, and the displacement organ executes the aspiration stroke. The pushbutton can be a drive element for manually operating a mechanical drive unit. Furthermore, it can be an electrical operating element (such as a momentary context switch) that is connected via an electronic control unit to an electromechanical drive unit to control it. To release the pipette tip or syringe, there is another operating element according to one embodiment that is coupled to an ejector which disconnects the pipette tip or syringe from its seat when the other operating element is actuated. According to one embodiment, the pushbutton is coupled to the ejector and also serves to release the pipette tip or syringe. The pushbutton is thereby actuated beyond the dispensing stroke so that an ejector coupled to the pushbutton acts on the pipette tip or syringe in order to disconnect it from its seat in the device module. According to another embodiment, the device module has a knob or respectively a dial for setting the dosing volume. The knob or respectively dial is coupled to a unit for setting the dosing volume of the device module that for example has an adjustable deflection for limiting the stroke of the displacement organ of the displacement unit, or an electronic control unit for starting and/or stopping and/or controlling an electromechanical drive unit. According to one embodiment, the knob or dial is another operating element. According to another embodiment, the button is simultaneously the knob. This device module manages with a single operating element.

A "pipette" is to be understood in particular as the pipette described in the introduction of the description with a manually driven mechanical drive unit, an electronically driven drive mechanism, or a manually driven mechanical drive mechanism, with electromechanical support.

The device module is a mechanical or a semi-electronic or fully electronic device module. A semi-electronic device module is a device module that has an electric servodrive for the displacement unit. The actuation force of the user acting on an operating element is amplified by the electric servodrive in order to drive the displacement organ of the displacement unit. In the case of a fully electronic pipette, the displacement organ of the displacement unit is driven by an electric drive motor having control electronics. The semi-electronic and fully electronic device modules can also be connected unidirectionally to an operating and/or display unit in order to display operating data of the device module determined by means of at least one sensor of the device module on the operating and/or display unit. According to one embodiment, the operating and/or display unit has operating elements by means of which the semi-electronic or fully electronic device module can be operated. The communication can run unidirectionally from the operating and/or display module to the device module. It can also be bidirectional to transmit the operating data from the device module to the operating and/or display module and transmit control commands to the device module in the opposite direction.

According to another embodiment, the device module of the pipette does not have a display unit.

According to a preferred embodiment, the device module has a long handle body. According to another embodiment of the pipette, the device module is designed at the top end without a wide head. According to another embodiment, the handle body is rod-shaped. According to another embodiment, the operating and/or display module is arranged in a pipette holder. According to another embodiment, the pipette holder has an electrical charger for charging an electrical energy storage unit of the device module of the pipette.

According to another embodiment, the device module has a manually driven mechanical and/or electromechanically driven drive unit for a displacement unit and/or an ejector.

According to one embodiment, the at least one operating and/or display unit is designed such that it only communicates with device modules within a specific spatial range. To accomplish this, the means for wireless communication, for example, has a specific and/or settable range and/or comprises a unit that makes it possible to determine whether the device module is located within a predetermined range around the operating and/or display module, for example based on the strength of the received radio signal. The specified range of the means for wireless communication is preferably 5 m, especially preferably 2 m, and most preferably 1 m.

According to another embodiment, the specified spatial range is limited by a maximum distance, or by one room or several rooms, or a part of a room of a building. If the specified spatial range is limited to one or more rooms or parts of a room of a building, an identification is archived in the device modules that are located in a specific spatial range. The identification can be archived in the device module by means of the operating and/or display module, or it can be saved therein by means of an operating unit of the device module. The identification can be archived from a central location by radio using a unit that has saved identifications assigned to a building layout. The assigned identification of the respective device module is determined with reference to the location of the device modules. The location data can be entered into the respective laboratory device and transmitted to the central unit, or entered directly into the central unit. The location and identification can be transmitted wirelessly, preferably by radio.

The operating and/or display unit determines the ID of the device modules communicating with it, and displays device modules that are within a specified spatial range. The user selects the specified spatial range(s) at which the operating and/or display module will display the device modules. With the assistance of the operating and/or display module, one or more device modules can be operated and/or monitored from the specified spatial range. Accordingly, the device modules can be operated and monitored from a plurality of specified spatial ranges using the operating and/or display module. According to one embodiment, the operating and/or display module simultaneously displays the data of a plurality of device modules and simultaneously allows a plurality of device modules to be operated and/or monitored.

In addition, the invention comprises a laboratory device system having a plurality of device modules, and at least one operating and/or display module, or at least one device module, and a plurality of operating and display modules.

Finally, the invention comprises a method for operating a laboratory device for handling liquids. Advantageous embodiments of the method are indicated in the dependent claims.

BRIEF DESCRIPTION OF THE SEVERAL VIEWS OF THE DRAWINGS

The invention will be further explained with reference to the accompanying drawings of exemplary embodiments.

The drawings show.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
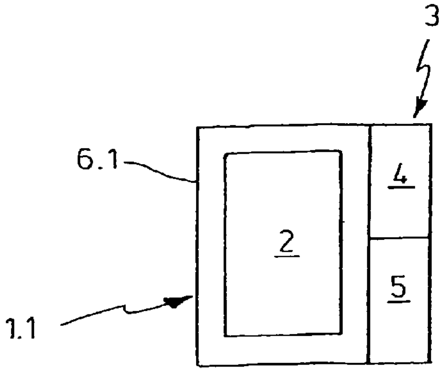
FIG. 1 A conventional pipette in a highly schematic block diagram.

According to FIG. 1, a conventional pipette 1.1 has a unit for pipetting liquids 2 and an operating and/or display unit 3. The operating and/or display unit 3 comprises an operating unit 4 and a display unit 5. The unit for pipetting liquids 2 and the operating and/or display unit 3 are physically combined in a common housing 6.1.

Figure 2A:
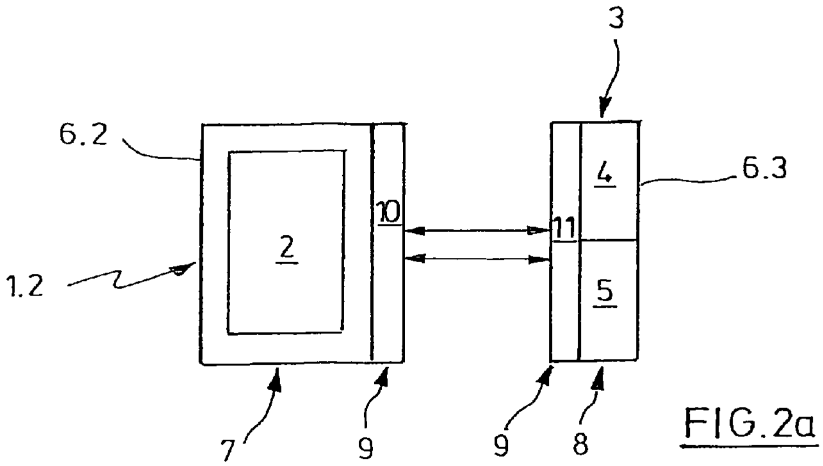
FIGS. 2 *a* and *b* Variants of pipettes according to the invention in highly schematic block diagrams.
Figure 2B:
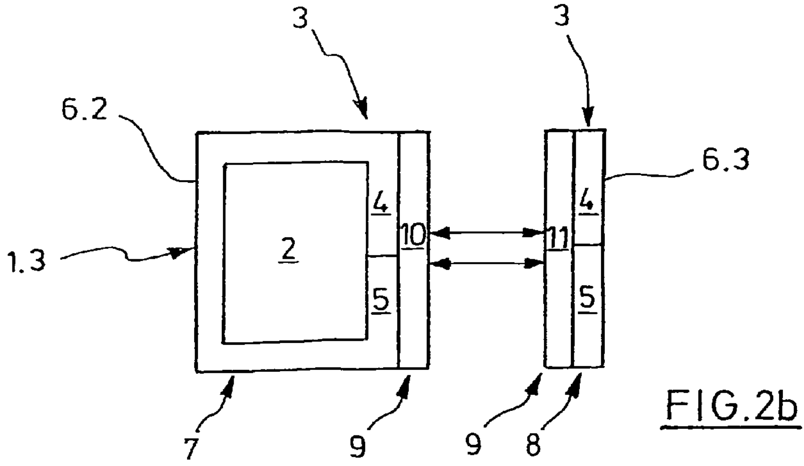

With a pipette according to the invention 1.2 according to FIG. 2 *a*, the unit for pipetting 2 and the operating unit 4 are part of a device module 7 having a compact housing 6.2. The operating and/or display unit 5 is accommodated in a housing 6.3 of a display module 8 completely physically separate from the device module 7. The operating and/or display module 8 comprises both the operating unit 4 as well as the display unit 5.

In addition, the device module 7 and the operating and/or display module 8 have means for wireless communication 9 that comprise an interface for the wireless communication 10 of the device module 7 and an interface for the wireless communication 11 of the operating and/or display module 8.

This example has bidirectional means for wireless communication 9. These means transmit data, in particular that are triggered by operating procedures, from the operating and/or display module 8 to the device module 7. Furthermore, they transmit in particular operating data detected in the device module 7 from the device module 7 to the display module 8.

The pipette 1.3 in FIG. 2 *b* differs from the version in FIG. 2 *a* in that only a part of the operating and/or display unit 3 is transferred to the operating and/or display module 8. Only the operating unit 4 or display unit 5, or parts of the operating or display unit 4, 5, or parts of the operating and display unit 4, 5 can be transferred. Correspondingly, the device module 7 has the operating or display unit 4, 5, or parts of the operating or display unit 4, 5, or parts of the operating and display unit 4, 5. In particular, it is possible to transfer operating elements and the display element that need to be particularly easy to operate or provide very easily identifiable images, whereas display elements for basic functions are available in the device module 7.

Figure 3A:
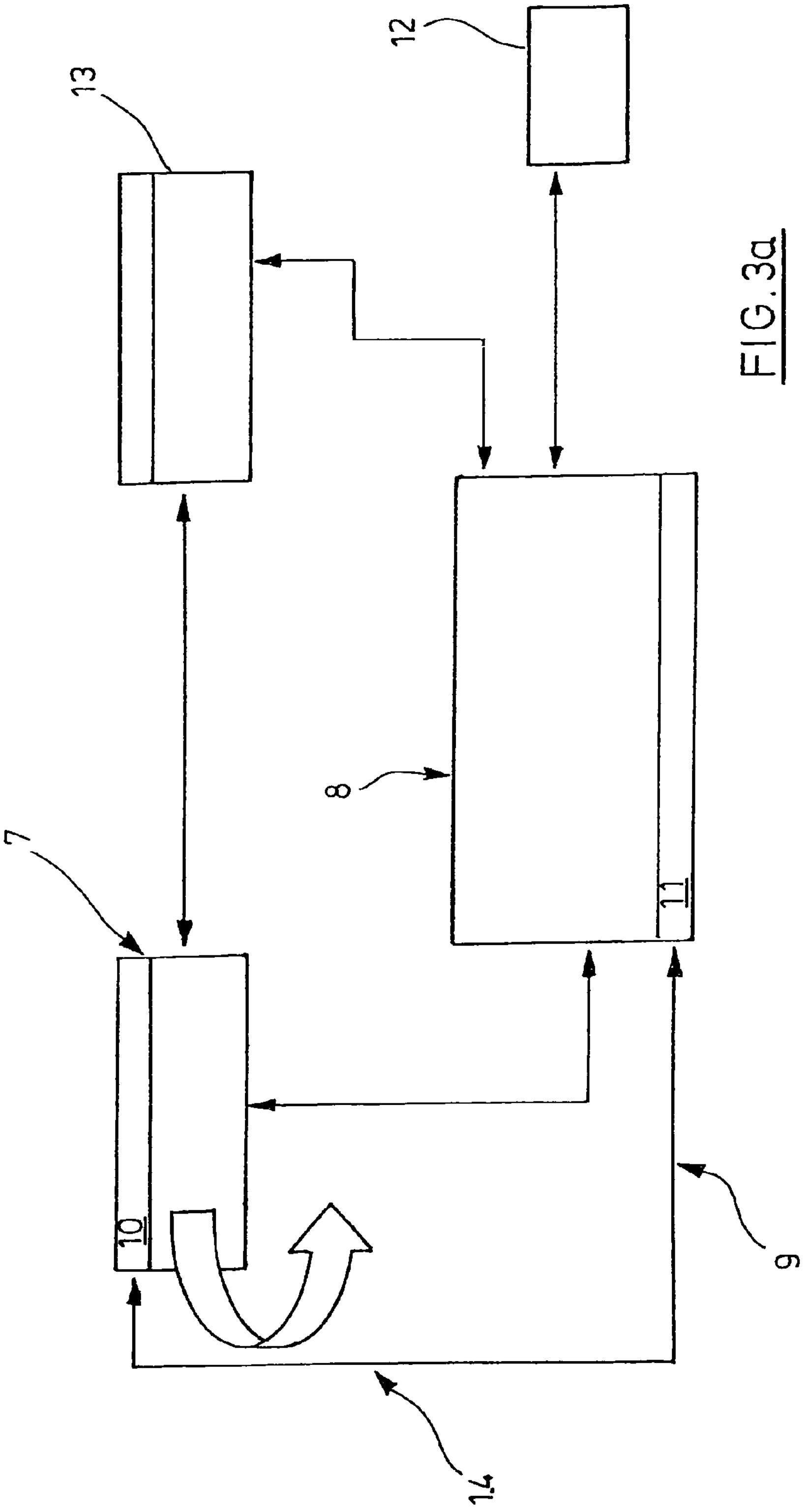
FIG. 3 *a* to *c* Variants of pipettes according to the invention in block diagrams.
Figure 3B:
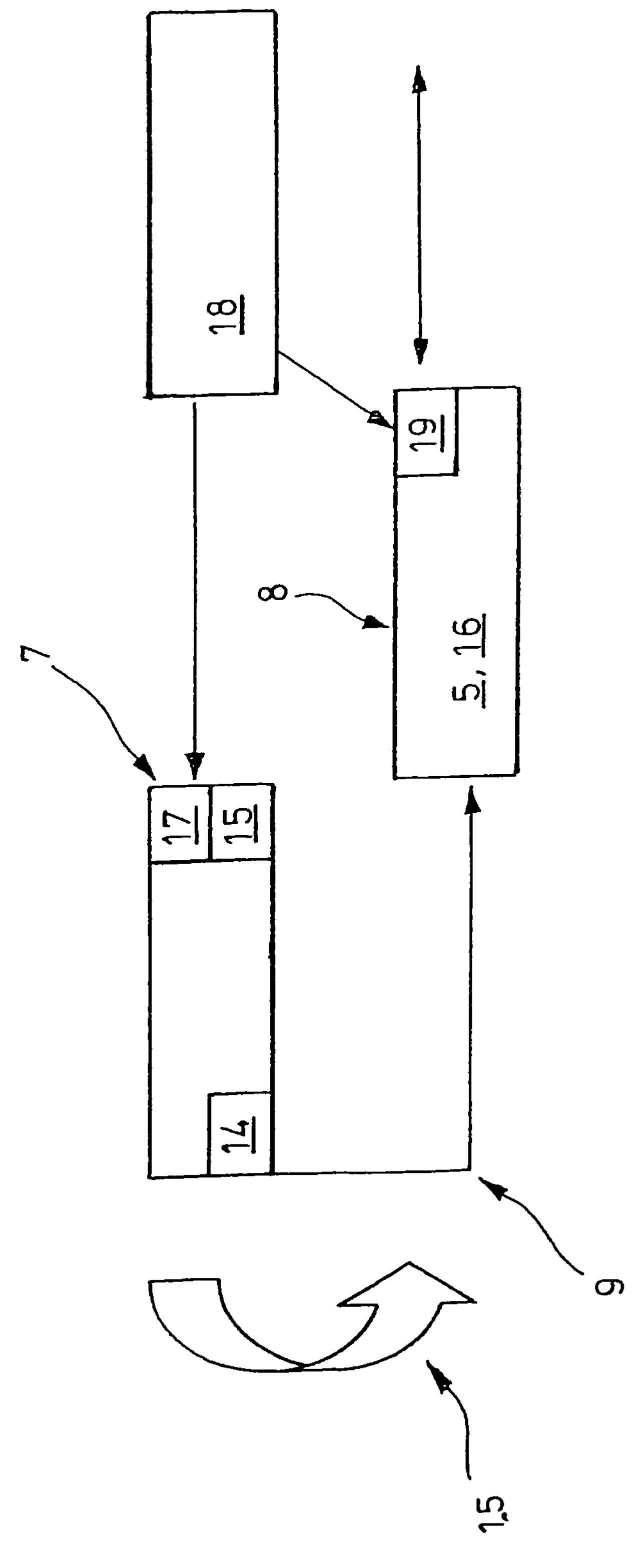

The pipette 1.4 in FIG. 3 *a* comprises a device module 7, an operating and/or display module 8, and a computer 12. The display module 8 is preferably portable. It is for example a PDA. A touchscreen is preferably used as the operating and/or display unit 4, 5. The communication between the operating and/or display module is wireless (for example by radio). In particular, one or more of the indicated technologies (Bluetooth, WC USB, W-Lan, ZigBee, IrDA or 4G) can be used for communication. A router 13 is also available for using a WLAN. WLAN enables large distances to be bridged. Furthermore, communication can take place via a modem 13.

The pipette 1.4 can be designed such that wired communication between the modules 7, 8 is also possible. To this end, the device module 7 and the operating and/or display module 8 each have electrical contacts that can be contacted with each other. To do this, the modules 7, 8 can for example be mechanically connected to each other by being clipped on, magnetically attached or suspended. The modules 7, 8 may also be electrically connectable with each other by means of cables. After electrical contact between the modules 7, 8 is established, the pipette 1.4 can be used in a conventional manner as a stationary or handheld pipette.

Communication between the display module 8 and computer 12 can occur wirelessly by means of one of the cited technologies, by wire, or by contacts.

The computer 12 makes it particularly easy to perform tasks that otherwise need to be done using the operating and/or display module 8. Examples of this are creating schedules for controlling the sequence of device modules 7, the evaluation of operating data (in particular measuring results) of the device modules 7, and the structured storage of operating data (in particular measuring results).

A pipette 1.5 according to FIG. 3 *b* comprises a device module 7 having at least one sensor 14 for detecting operating data. The device module 7 has operating elements 15.

An operating and/or display module 8 also exists that can be designed so that it only comprises a display unit 5 in the form of a screen 16, and not an operating unit.

The operating data are transmitted from the device module 7 to the operating and/or display module 8 wirelessly by means for wireless communication 9 using one of the aforementioned technologies, and possibly also by wire or contacts.

The sensor 14 is for example a sensor for detecting the set and/or actually dosed dosing volume, a step counter for counting dosing steps, a force sensor for measuring the attachment force of a pipette tip, a set-down or contact sensor for detecting the setting-down of a pipette tip on a base, an acceleration sensor, a proximity sensor for detecting the use of the device module 7, or a tilt sensor for detecting the alignment of the device module 7. The tilt sensor serves to improve the precision of the device module by detecting the tilt of the device module.

Furthermore, a sensor 14 can be used that for example is a sensor for detecting data from an RFID chip integrated in the device module. The data from the RFID chip can also be read out of the device module 7 by means of a suitable reader of the operating and/or display module 8.

Unidirectional communication from the device module 7 to the operating and/or display module 8 occurs by means of the means for wireless communication 9. This method is economical, fast and uncomplicated. The operating data detected by the sensor 14 are transmitted in real time, displayed and possibly permanently saved in the operating and/or display module 8. The user can be guided when using the pipette 1.5, wherein additional acoustic signals may also be emitted by the display module 8.

The data selection permits the following additional uses:

When the set volume and its change are displayed, interactive volume setting is possible. The user can perceive the set volume at a location that is useful for his work.

The operating and/or display module 8 can be equipped with a calibration function. This allows the entry of a material constant (such as viscosity) of the liquid to be dosed or the geographic height of the respective location, and displays the assigned calibrated dosing volume for a desired dosing volume. The user can then set these, possibly interactively.

Furthermore, the operating and/or display module 8 can determine and display a service interval. The laboratory device can offer a call for service, for example by e-mail or SMS that can be triggered by the user. The pipette can in principle also automatically call for service.

In addition, the operating and/or display module 8 can be designed so that it displays the perfect seat of the pipette tip, and/or emits a warning and/or error message when the pipette tip is not attached with the necessary attachment force and/or the pipette tip is seated on a base, and/or when the device module is improperly aligned.

The detected operating data can be transmitted by the operating and/or display module 8 to a downstream application. The transmission can be to a computer 12, network, server, etc. The transmission can be wireless or wired according to one of the aforementioned technologies.

The device module 7 requires an electrical power supply 17 to operate the sensor 14, a unit for converting the signals of the sensor 14 (such as an A/D converter), and the interface for wirelessly communicating with the operating and/or display module 8. This can be done by means of accumulators such as lithium-ion batteries. The accumulators can be charged by means of electrical contacts using a charger 18. This can also charge an electrical power supply 19 for the display module 8.

The transmission protocol of the device module 7 allows the operating and/or display module 8 to identify the device module 7. Consequently, a plurality of device modules 7 can work together with the operating and/or display module 8, and operating data from a plurality of device modules 7 can be assigned to them. The operating data of a plurality of device modules 7 can therefore be displayed together in a clearly assignable manner.

According to one embodiment, the operating and/or display module 8 contains a cell phone with a SIM card (subscriber identity module) to enable data to be transmitted via the mobile phone network. The device module 7 can be correspondingly equipped with a cell phone and a SIM card.

A plurality of device modules 7 can be kept ready on one pipette holder for a plurality of pipettes. The pipette holder can for example be designed as a carousel having a rotatable carrier with holders for pipettes at the top end of a stand. The pipette holder can be combined with the operating and/or display module 8. For example, six device modules 7 can be combined with one display module 8 on one pipette holder.

Figure 3C:
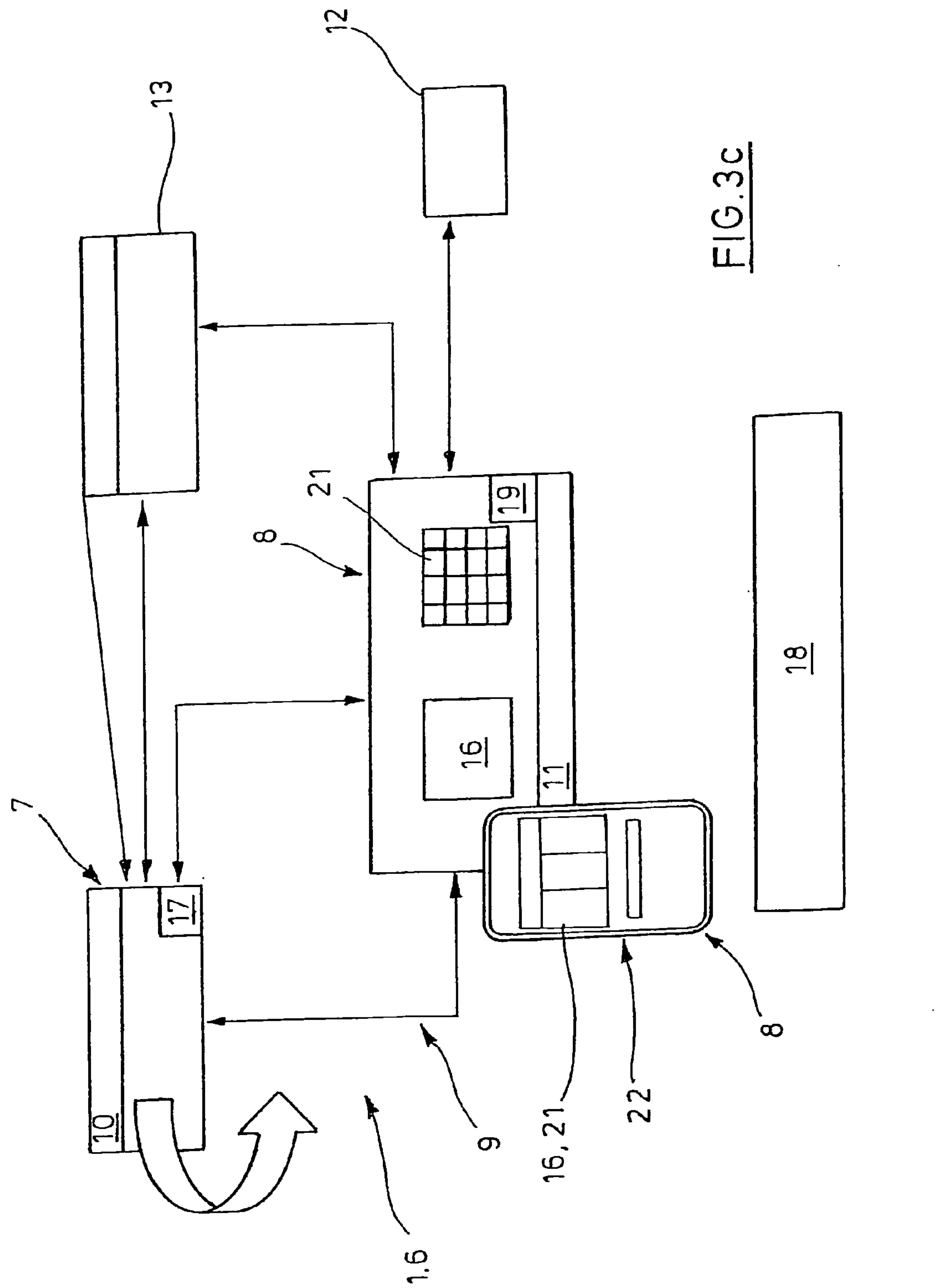

According to FIG. 3*c*, the laboratory device 1.6 comprises a device module 7 having a control unit 20 for controlling the unit for handling liquids. Furthermore, it has an operating and/or display module 8 comprising a screen 16 and a rudimentary keyboard with keys 21. The means for wireless communication 9 enables unidirectional communication. The aforementioned techniques of wireless communication can be used. In particular, the wireless communication can occur via a WLAN and a router or modem 13.

Optionally, the laboratory device comprises a computer 12 that can be coupled wirelessly or by wire to the operating and/or display module 8.

The operating and/or display module 8 can for example be realized by means of a smartphone 22. A suitable program can be developed and for example made available on the Internet.

The operating and/or display module 8 and the device module 7 are connected by unidirectional or bidirectional means for wireless communication 9. Operating data can be transmitted via unidirectional means for wireless communication 9 from the device module 7 to the smartphone 22 and displayed thereby corresponding to the exemplary embodiment in FIG. 3*b*. The user can also use the operating and/or display module 8 as a programming unit via bidirectional means for wireless communication. The data are generated by the device module 7, the operating and/or display unit 8 with the aid of external programs (for example on the computer 12) and uploaded to the device module 7. The hardware of the device module 7 can thereby be substantially reduced. In the case of an electrical pipette, the operating and display units 8 can be reduced to pushbuttons for starting and possibly stopping dosing, an acoustic signal generator, and possibly an ejector for pipette tips or syringes.

According to one embodiment, the electrical charger 18 for the power supply of various device modules 7 and/or operating and/or display modules 8 can be combined into a single power supply that is connectable to the modules 7, 8 via electrical contacts.

Figure 4B:
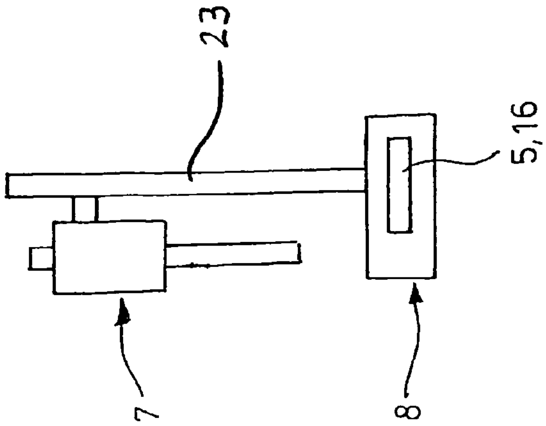
FIGS. 4 *a* and *b* A schematic perspective view of a pipette according to the invention (FIG. 4*a*) and in a front view with available modules (FIG. 4*b*)
Figure 4A:
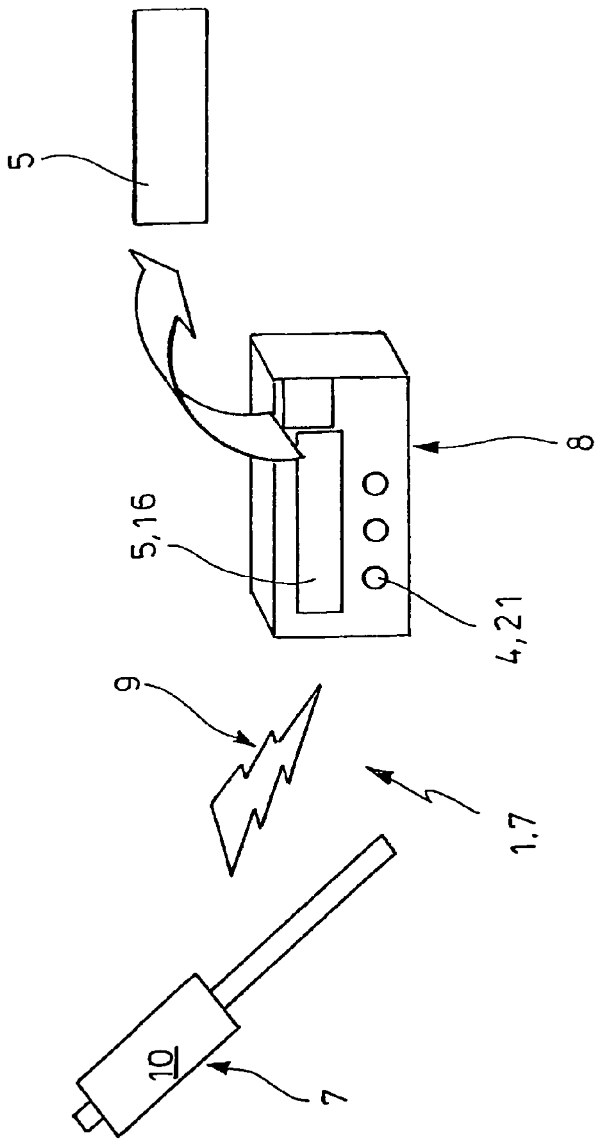

According to FIG. 4*a*, a pipette 1.7 comprises a device module 7 with a displacement unit and drive unit. In addition, the pipette comprises an operating and/or display module 8 having an operating unit 4 in the form of keys 21, and a display unit 5 in the form of a screen 16. The device module 7 and operating and/or display module 8 have interfaces 10, 11 for wireless communication.

The display unit 5 can be disconnected from the display module 8. After disconnecting the operating and/or display module 8, the display unit 5 can be attached as a mobile clip to the clock, clothes, or other objects within the visual range of the user.

FIG. 4*a* shows the device module 7 being used as a handheld pipette.

Furthermore, the device module 7 of the pipette can be connected via a stand 23 with the operating and/or display module 8 to a stationary pipette as shown in FIG. 4*b*.

Figure 5A:
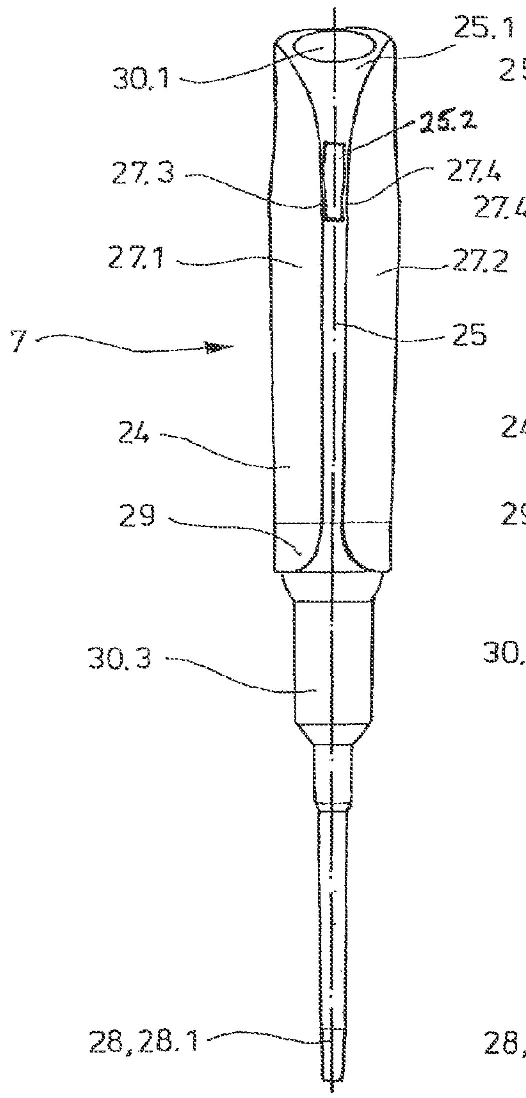
FIG. 5 *a* to *c* A device module of a pipette according to the invention in a front view (FIG. 5*a*), in a side view (FIG. 5*b*) and with a pipette tip in a rear view (FIG. 5*c*)
Figure 5B:
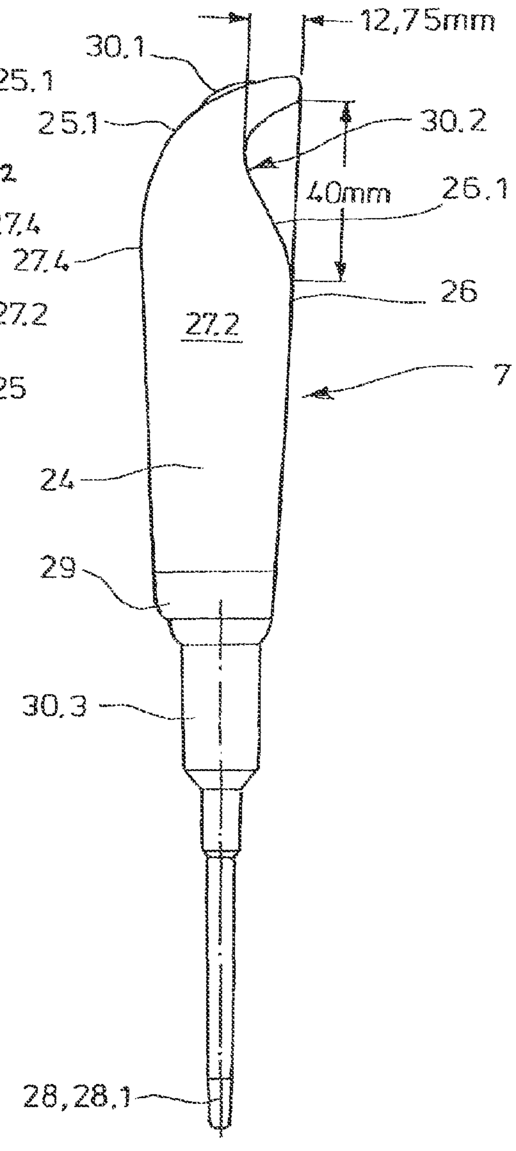
Figure 5C:
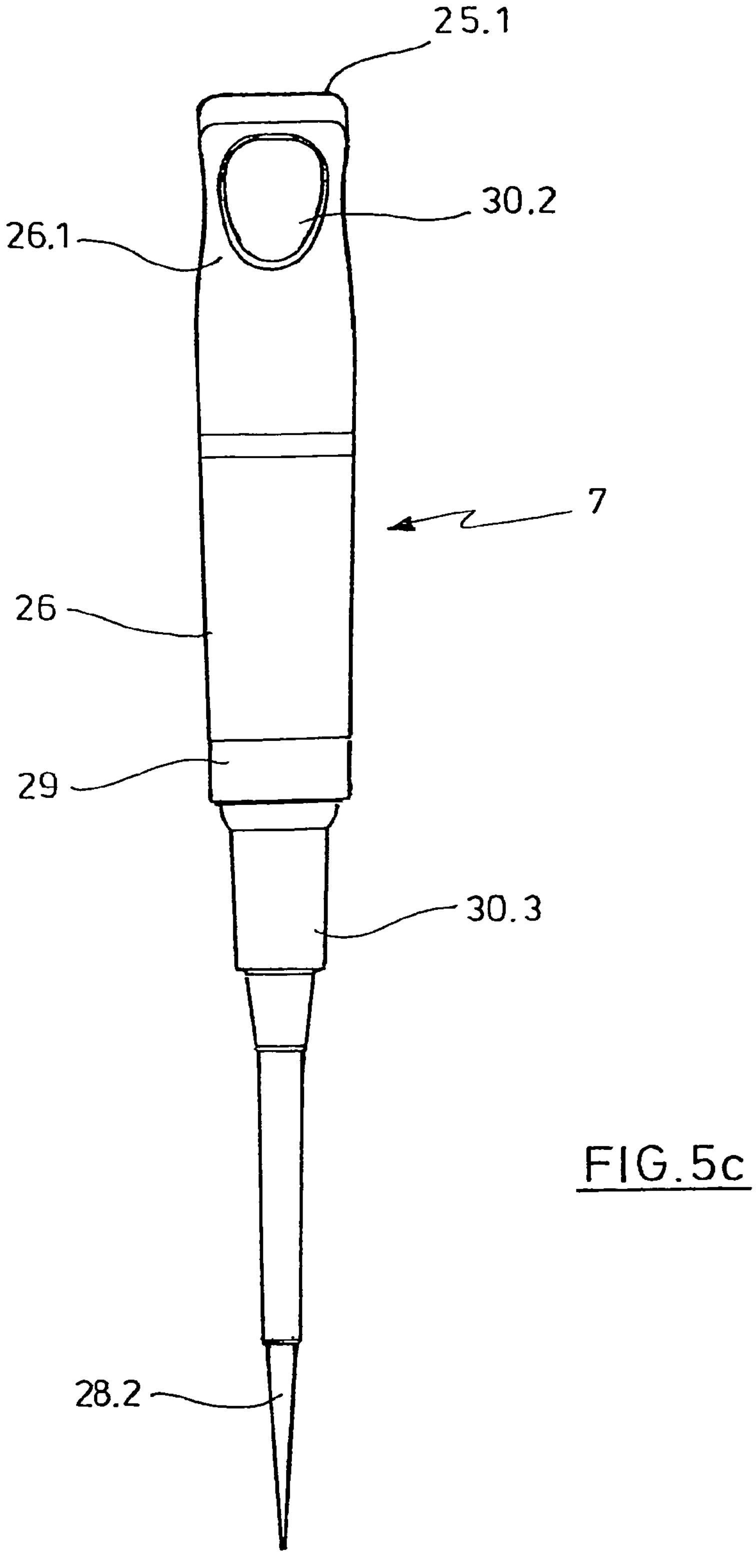

FIG. 5 *a* to *c* display an exemplary embodiment of a handheld device module 7 of a pipette according to the invention. The device module 7 has an elongated, essentially rod-shaped handle body 24.

The handle body 24 has a front grip surface 25 that is approximately straight in the bottom part of the handle body in a vertical sectional plane through the handle body 24 that is the plane of the drawing in FIG. 5 *b*, and curves continuously across the handle body toward a thumb rest 25.1 in the top part of the handle body 24 above the area that comes into contact with the surface of the hand. The front grip surface 25 is only arched in one direction, and the front grip surface 25 in the bottom part of the handle body 24 is nearly flat and narrow, and gradually widens in the top part of the handle body 24 above the area that comes into contact with the surface of the hand, and curves across the handle body toward the thumb rest 25.1 that is enclosed by a radius at the top end of the handle body 24.

The handle body 24 has a rear grip surface 26 having a recess 26.1 below the top end. In the vertical sectional plane through the front grip surface 25 that is the plane of the drawing in FIG. 5 *b*, the rear grip surface 26 is nearly straight at the bottom, above which it initially curves inward in the seat area for the index finger, and then curves outward in an opposite direction further above. Above that, it touches the top end of the thumb resting area 25.1. The rear grip surface 26 curves on both sides of the vertical sectional plane toward the lateral grip surfaces 27.1, 27.2 that terminate with a gradually decreasing curvature on the two sides toward the front grip surface 24 with which they meet on both sides in a bevel 27.3, 27.4. Alternately, the side grip surfaces 27.1, 27.2 can be designed approximately flat so that a wider bevel exists, preferably with a radius in each case, between the rear grip surface 26 and the side grip surfaces 27.1, 27.2.

The handle body 24 narrows while descending below the seat area for the index finger, achieving a pleasant downward narrowing of the volume. In the vertical sectional plane that divides the front grip surface 25, the handle body 24 narrows more strongly than in a vertical sectional plane perpendicular thereto, and the degree of narrowing gradually decreases between these vertical sectional planes.

The height of the handle body 24 is 100 to 180 mm and/or the circumference is 80 to 130 mm. The handle body 24 with dimensions within the indicated ranges is considered pleasant by users with different hand sizes. The height of the handle body 24 is preferably 120 to 140 mm and/or the circumference is preferably 90 to 120 mm. The preferred height is 133 mm, and/or the preferred circumference is 105 mm. The circumference is measured at the thickest point of the handle body 24.

The depth and height of the recess 26.1 are dimensioned so that an average index finger aligned perpendicular to the plane of the drawing in FIG. 5*b* can be inserted therein and moved to actuate the other operating element 30.2. The depth is preferentially 5 to 20 mm and preferably 10 to 15 mm, for example approximately 12.75 mm. The height is preferentially 20 to 60 mm and preferably 35 to 50 mm, for example approximately 40 mm.

A seat 28.1 for a pipette tip 28.2 is arranged on a tubular carrier 28 that projects downward from the bottom end of the handle body 24.

The tubular carrier 28 is conical and/or stepped, and narrows downward gradually and/or in steps. At the bottom end, a conical or cylindrical end section of the tubular carrier 28 forms the seat 28.1 for attaching a pipette tip 28.2. Between the tubular carrier 28 with the seat 28.1 for the pipette tip and the handle body 24, there is a joint (not shown) for pivoting the seat 28.1 with reference to the handle body 24. By means of the joint, the alignment of the seat 28.1 with reference to the handle body can be adapted to the position of the user in the respective working position. In addition, the joint allows the grip to be changed between work cycles and thereby reduces the concentrated load acting on the user of a pipette when the seat 28.1 is arranged fixedly with reference to the handle body 24.

A fixing unit for fixing the joint in a specific position exists between the seat 28.1 and the handle body 24. The fixing device has a threaded ring 29 for clamping the joint tight at the bottom end of the handle body. By means of the fixing device, the alignment of the seat 28.1 can be fixed with reference to the handle body 24 so that it does not unintentionally shift.

The handle body 24 comprises a displacement unit (not shown) with a displacement organ and a drive unit coupled thereto. The displacement unit is preferably a cylinder having a plunger displaceable therein as the displacement organ. The drive unit is preferably an electromechanically driven drive unit, or a manually driven mechanical drive unit with electromechanical support. It can also be a manually driven mechanical drive unit, however.

An operating element 30.1 that can be actuated by a thumb is arranged in the thumb rest 25.1. The operating element 30.1 is a knob-shaped button. In a vertical section, the button is lens-shaped and projects slightly upward beyond the front grip surface 25.

The operating element 30.1 is a start/stop button with which the operating procedures, or parts of operating procedures, can be started and stopped as necessary. According to one embodiment, the pipette is adjusted (for example, the mode of operation, dosing amount, plunger speed) and/or programmed (for example, several sequential operating procedures) by means of an external operating and display unit so that the procedures only need to be started or stopped as necessary by means of the operating element 30.1. The operating element 30.1 is preferably an electrical button.

Another operating element 30.2 is arranged in the recess 26.1 in the rear grip surface 26. The other operating element 30.2 is the operating element of a tip ejector 30.3, i.e., a device for ejecting or respectively releasing a pipette tip or syringe from the pipette.

The other operating element 30.2 is a toggle switch. It is saddle-shaped so that it fits the shape of the rear grip surface 26 of the recess 26.1 and the transition to the side surfaces 27.1, 27.2. The additional operating element 30.2 projects slightly beyond the rear grip surface 26.

The additional operating element 30.2 is coupled to a mechanical drive unit (not shown) that is coupled to a tip ejector 30.3 that is assigned to the seat 28.1 for a pipette tip or syringe in order release a pipette tip located there from the seat when the additional operating element is actuated.

The tip ejector 30.3 is a sleeve arranged on the tubular carrier 28, and the tubular carrier 28 and sleeve are displaceable relative to each other by means of the mechanical drive unit. To eject a pipette tip 28.2 from the seat 28.1 at the bottom end of the tubular carrier 28, the sleeve 30.3 is shifted further toward the bottom end of the tubular carrier 28 to push off a pipette tip 28.3 located there. Conversely, the tubular carrier 28 can be withdrawn deeper into the sleeve 30.3.

A display unit 25.2 such as an LCD display is optionally arranged in the front grip surface 25. The display unit 25.2 preferably has an elongated shape that extends in the longitudinal direction of the front grip surface 25. The display unit is preferably arranged in the bottom part of the handle. It serves to display operating data such as a mode of operation, or the dosing volume and/or the charge of a battery or an accumulator and/or an error message and/or a warning. To follow are exemplary embodiments of operating and/or display modules 8 (combined with operating modules as the circumstances require) that are transparent so that the user can look through the display unit 5 at the workplace. The advantage is that the user can continuously look at the field of work as well as the display output by the display unit. The display unit 5 can be designed as follows:

a) As a pane that can be folded up in front of the workplace as needed. The pane is preferably designed to be mobile and even more preferably glare-free.

b) As a small, transparent display unit that only extends partially into the visual field of the user.

c) As glasses, especially safety glasses, that are supplied with the corresponding data.

d) As a single-eye, transparent display that is located directly in front of the eye of the user.

e) As a microscopic visual field.

f) As a screen (such as an LCD or TFT).

g) As a complete workplace including fixed and/or variable locations for device modules.

The data can be supplied in real time to the display unit in one or more color for example by:

a) A collimator having a corresponding deflection.

b) By LCD or LED elements invisibly embedded at fixed positions in the display unit, preferably a head-up display. These focus preferably on the visual plane of the user.

c) By using the entire display unit as an LED or LCD display unit (such as OLEDs).

d) By combining the HD display with a touch-sensitive surface element and simultaneously using it as a touchscreen.

By means of a wireless connection to the executing device module, configuration as well as start and stop commands can be transmitted.

e) The transparent display unit can simultaneously be the central processing unit for controlling the device to be operated with which it is wirelessly connected.

Figure 6:
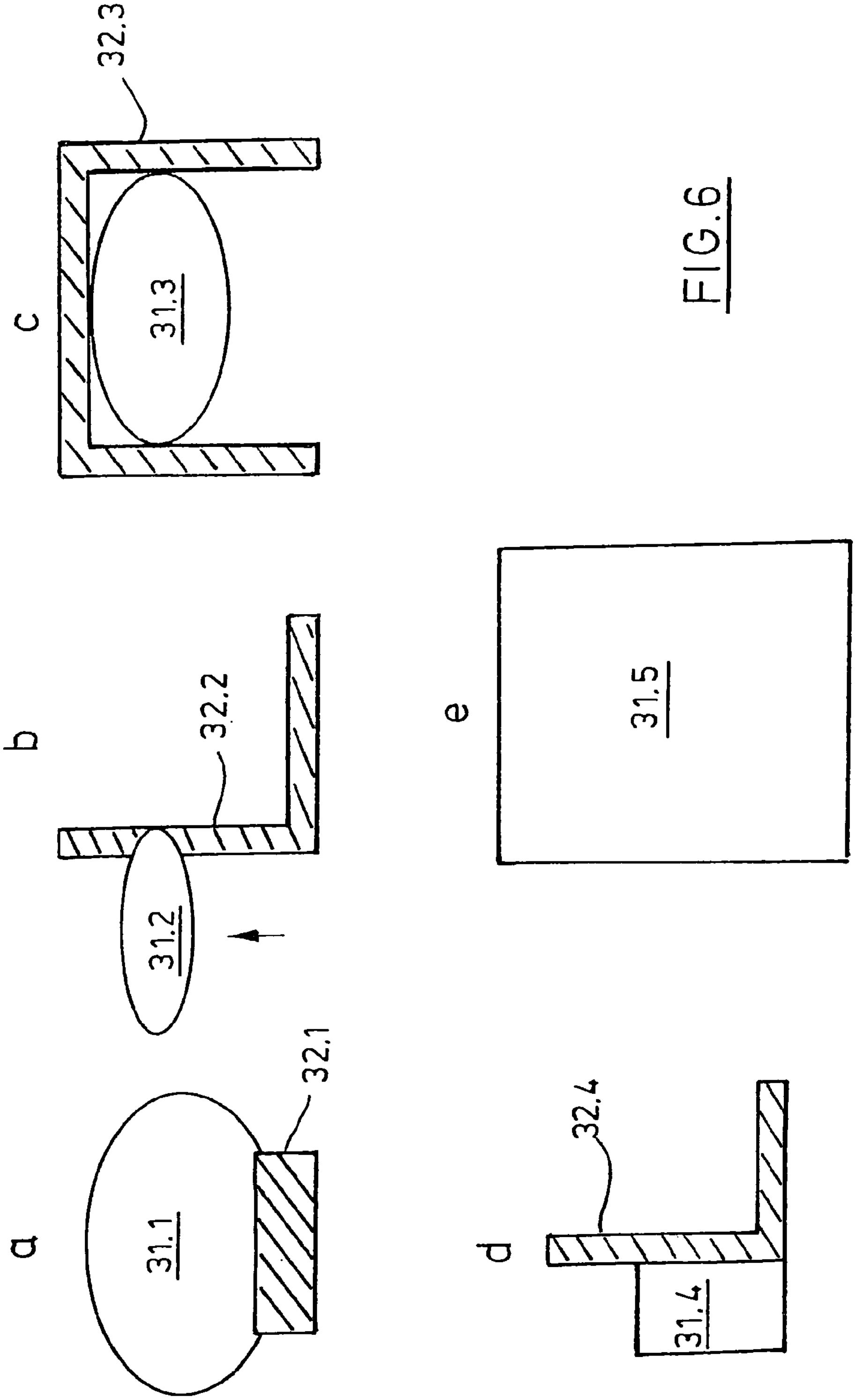
FIG. 6 *a* to *e* Front view of variants of a transparent display unit.

According to FIG. 6 *a*, the pane 31.1 of a display unit 5 is movably attached to a pedestal-like carrier 32.1.

According to 6 *b*, a smaller pane 31.2 is held on one side by an L-shaped carrier 32.2 so that it extends laterally into the visual field of work. In this arrangement, the display can also be attached with adjustable height. This arrangement can already be permanently installed or installed by the user in a manner appropriate for his application.

According to FIG. 6 *c*, the pane 31.3 is arranged above the work surface and for example held by a carrier 32.3 in the form of a portal.

In FIG. 6 *d*, the pane 31.4 is held in the bottom area of the visual field of work by a carrier 32.4. In this design, the pane 31.4 primarily serves as a display element that only has to be looked at occasionally.

FIG. 6 *e* shows a large pane 31.5 that, for example, can be a pane of a cover consisting of transparent material of the laboratory device. It can for example be the cover of a safety workbench, dosing station, workstation, or a radiation protection screen made of glass or plastic.

Figure 7:
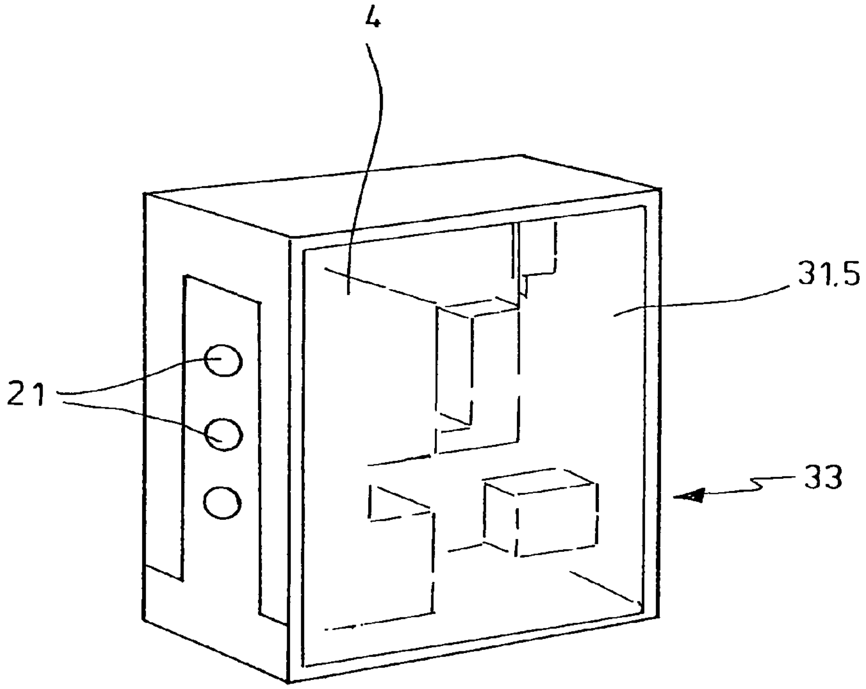
FIG. 7 A perspective view at an angle from the side of a transparent display unit integrated in an automated laboratory system.

FIG. 7 displays the pane 31.5 from FIG. 6*e* in a dosing station 33. The pane 31.5 also comprises an operating unit 4 with keys 21.

Figure 8:
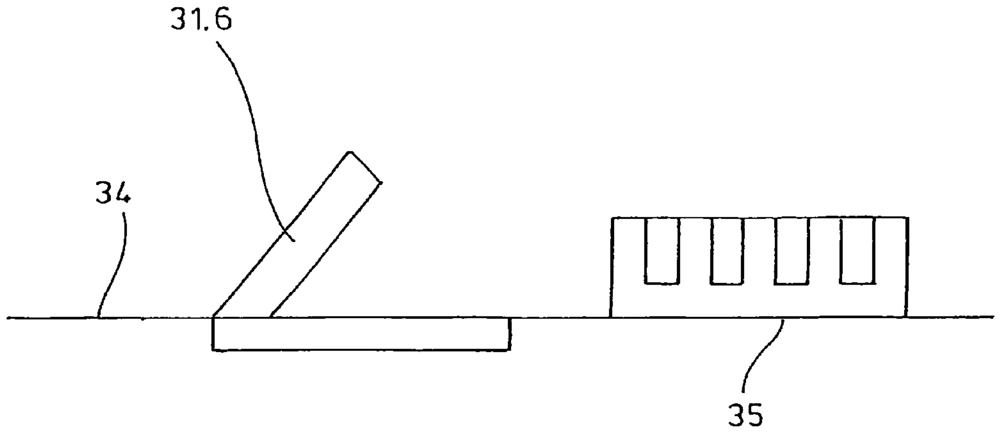
FIG. 8 Another version of a transparent display unit in a side view.

FIG. 8 shows a pane 31.6 that is embedded in a laboratory table 34 in front of a work surface 35 and can be folded up into the visual field of the user.

Figure 9:
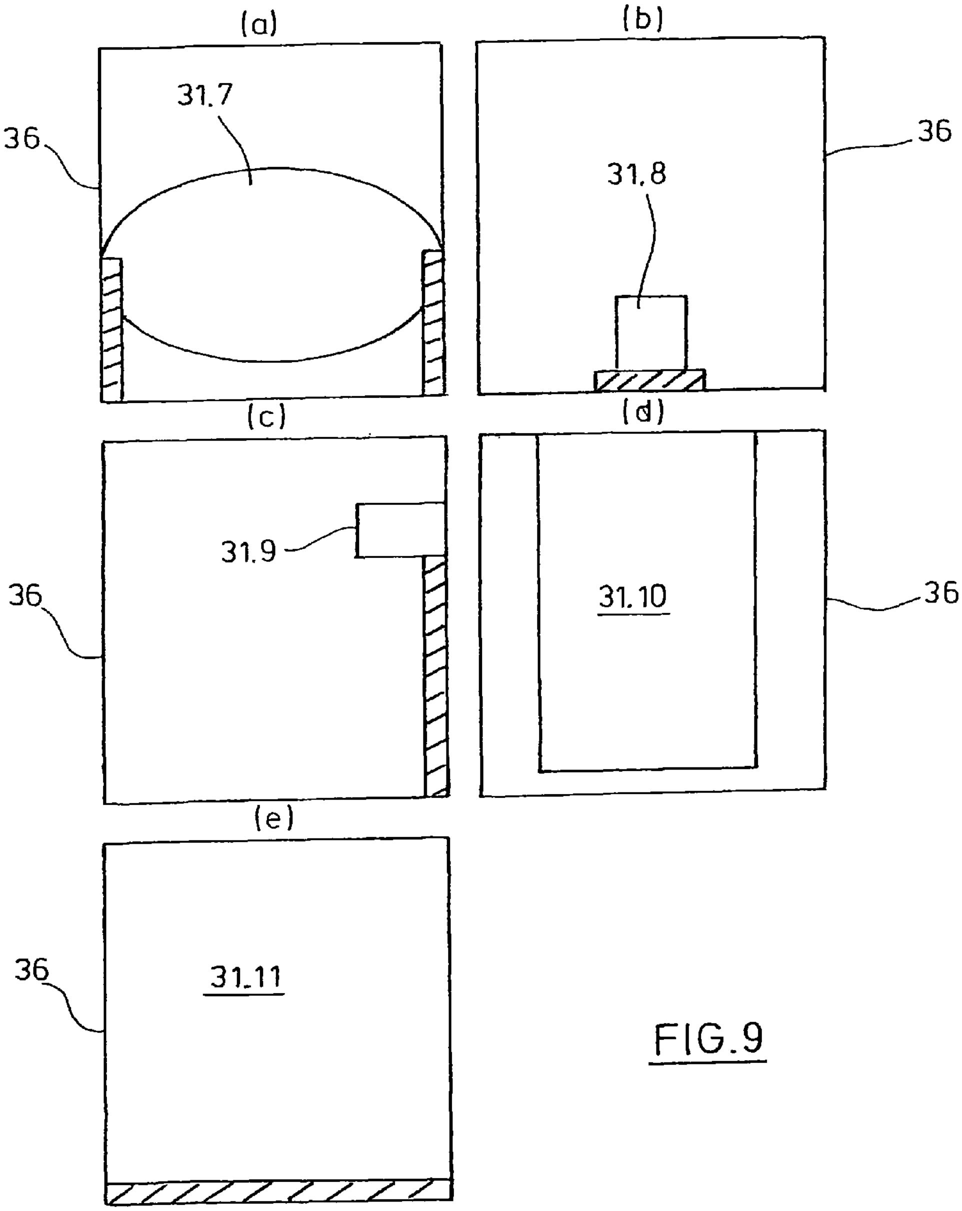
FIG. 9 *a* to *e* Front view of additional variants of a transparent display unit.

FIG. 9 *a* to *e* shows panes 31.7 to 31.11 of various designs and locations in the field of work and visual field 36 of the user.

The panes 31.1 to 31.4 and 31.6 to 31.11 are designed so that the user can extend his arms on the sides, above or below the pane and can work behind the display unit with his tools.

The panes 31.1 to 31.11 can consist of glass or plastic, and the information can be projected on the panes by means of a projection unit. The display unit 5 can also be correspondingly designed as a head-up display (HD).

In addition, the panes 31 can also be designed as an LCD screen. LCD screens are in principle completely transparent. The polarization is intentionally changed only at the places provided with liquid crystal so that they appear black or respectively colored. The pane can also be used entirely as a multilayer active LCD screen, or only at specific locations at which preprinted symbols can be displayed next to alphanumeric characters. In addition, a pressure-sensitive film with correspondingly large pressure fields with any type of sensor technology can be placed over the top LCD layer. This can create a user interface with an operating unit 4 as shown in FIG. 7.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A pipette with:

a rod-shaped handle body (24) in which an electrical drive unit is arranged for a displacement unit having an operating element (30.1) in the top end, and having a seat (28.2) for a pipette tip (28.3) or syringe in the bottom end, characterized in that the handle body (24) has a front grip surface (25) that is approximately straight in the bottom part of the handle body (24) in a vertical sectional plane through the handle body (24), and curves across the handle body (24) toward a thumb rest (25.1) in the top part of the handle body (44) above the area that comes into contact with the surface of the hand, an LCD display unit arranged on the front grip surface, and the operating element (30.1) actuatable with the thumb is arranged in the thumb rest (25.1) and is a knob-shaped button.

2. The pipette according to claim 1, wherein the front grip surface (25) is only convex in one direction, and the front grip surface (25) in the bottom part of the handle body (24) is nearly flat and narrow, and gradually widens in the top part of the handle body (24) above the area that comes into contact with the surface of the hand, and curves across the handle body toward the thumb rest (25.1) that is enclosed by a radius at the top end of the handle body (24).

3. The pipette according to claim 1, wherein the handle body (24) has a rear grip surface (26) having a recess (26.1) below the top end in which another operating element (30.2) is arranged that can be actuated with the index finger, and the rear grip surface (26) is nearly straight at the bottom in the vertical sectional plane through the front grip surface (25), and thereabove it initially curves inward in the area of the recess, and then curves outward in an opposite direction further above, above which it touches the top end of the area of the thumb rest (25.1), and curves on both sides of the vertical sectional plane toward lateral grip surfaces (27.1, 27.2) that, on both sides, run toward the front grip surface with which they meet on both sides in a bevel (27.3, 27.4).

4. The pipette according to claim 3, wherein the handle body (24) narrows downward below the recess (26.1).

5. The pipette according to claim 4, wherein the handle body (24) narrows more strongly in the vertical plane that divides the front grip surface (25) than in a vertical plane perpendicular thereto, and the degree of narrowing gradually decreases between these vertical planes.

6. The pipette according to claim 1, wherein the height of the handle body (24) is 100 to 180 mm and/or the circumference is 80 to 130 mm.

7. The pipette according to claim 1, wherein there is a joint for pivoting the seat with reference to the handle body between the seat (28.1) of the pipette tip (28.2) or syringe and the handle body (24).

8. The pipette according to claim 7, wherein a fixing unit (29) for fixing the joint in a specific position exists between the seat and the handle body (24).

9. The pipette according to claim 1, wherein the seat (28.2) for a pipette tip (24.3) is arranged at the bottom on a tubular carrier (28.1) that projects downward from the bottom end of the handle body (24).

10. The pipette according to claim 9, wherein the tubular carrier (28.1) is conical and/or stepped, and narrows downward gradually and/or in steps.

11. The pipette according to claim 9, further including a tip ejector (30.3) formed as a sleeve arranged on the tubular carrier (28.1), and the tubular carrier (28.1) and sleeve can move relative to each other by means of a mechanical drive unit.

12. A pipette according to claim 1, wherein the electrical drive unit is an electromechanically driven drive unit.

13. A system comprising the pipette according to claim 1, and an operating and/or display module (8) physically separate from the pipette (7) completely or partially comprises an operating and/or display unit (3), and means are provided for wireless communication (7) between the device module (7) and the operating and/or display module (8).

14. The system according to claim 13, wherein the pipette (7) comprises an electronic control unit for detecting operating data and/or controlling the electronic control unit for handling liquids.

15. The pipette according to claim 13, wherein the operating and/or display module (8) is constructed and arranged such that operating parameters and/or modes from the pipette and/or programs can be entered by means of its operating unit to control the pipette and/or routines for performing operating procedures of the pipette.

16. The system according to claim 13, wherein the operating and/or display module (8) is constructed and arranged so that it can be used to remotely control pipettes (7).

17. The system according to claim 13, wherein the operating and/or display module (8) is constructed and arranged such that it recognizes the respective device module (7) when communicating with one device module of a plurality of device modules (7), and automatically sets a device-specific user interface on the operating and/or display unit (8).

18. The system according to claim 13, wherein the operating and/or display module (8) is constructed and arranged so that it can only be used when a proof of authorization is entered.

19. The system according to claim 13, wherein the operating and/or display module (8) is constructed and arranged such that programs, routines, measuring results and other data can only be processed when proof of authorization it is entered.

20. The system according to claim 13, wherein the operating and display module (8) is constructed and arranged to have a reservation function by means of which the pipette can be blocked for intervals for users.

21. The system according to claim 13, wherein the operating and/or display module (8) has switches and/or keys and a keyboard and a microphone and a screen and/or a touch-sensitive screen and/or a loudspeaker and an acoustic signal generator.

22. The system according to claim 13, wherein the device module (7) is handheld, and/or the operating and/or display module (8) is portable and handheld by one person.

23. The system according to claim 13, wherein the operating and display module (8) is a cell phone and a personal digital assistant and a smartphone (22).

24. The system according to claim 13, wherein the operating and/or display module (8) comprises a head-up display and/or a transparent screen (31) that can be placed in front of a work area.

25. The system according to claim 13 having an electronic data processing system (12) physically separate from the pipette and operating and/or display module (8), and means for providing wireless communication or by wire between the operating and/or display module and the electronic data processing system.

26. The system according to claim 13, wherein the means for wireless communication (9) communicates by means of radio waves and/or optically and/or inductively and/or capacitively.

27. The system according to claim 13, wherein the operating and/or display module (8) is releasably connectable with the pipette (7).

28. The system according to claim 13, wherein the pipette (7) has an electrical charger (18) for charging an electrical energy storage unit (17, 19) of the operating and/or display module (8), and electrical contacts are available for transmitting an electrical charge from the pipette (7) to the operating and/or display module (8) or from the operating and/or display module to the pipette.

29. The system according to claim 13, wherein the pipette (7) and the operating and/or display module (8) have contacts that are connectable with each other for communication and/or transmitting an electrical charge between the pipette (7) and operating and display module (8).

30. The system according to claim 13, wherein the pipette has at least one operating element (15) for controlling dosing procedures and/or disconnecting a pipette tip (26) or syringe from the pipette (7).

31. The system according to claim 13, wherein the pipette (7) has a manual and motor drive for an ejector.

32. The system according to claim 13, wherein the pipette (7) does not have a display unit.

33. The system according to claim 13, wherein the operating and/or display module is arranged on a pipette holder.

34. A laboratory device system having a plurality of pipettes according to claim 1, and at least one operating and display.

35. The laboratory devices system according to claim 34, wherein the at least one operating and display unit is constructed and arranged such that it only communicates with pipettes within a specific spatial range.

36. The laboratory device system according to claim 34, wherein the laboratory device system has a specified spatial range, the specified spatial range being limited by a maximum distance, or by one room or a part of a room, or several rooms of a building.

* * * * *